United States Patent
Los

(10) Patent No.: US 9,413,944 B2
(45) Date of Patent: Aug. 9, 2016

(54) APPARATUS AND METHOD FOR CONTROLLING A CAMERA IN AN ELECTRONIC DEVICE

(75) Inventor: Oleg Los, Buffalo Grove, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 788 days.

(21) Appl. No.: 13/092,717

(22) Filed: Apr. 22, 2011

(65) Prior Publication Data

US 2012/0270596 A1    Oct. 25, 2012

(51) Int. Cl.
H04N 5/232    (2006.01)

(52) U.S. Cl.
CPC ................................ *H04N 5/23212* (2013.01)

(58) Field of Classification Search
CPC .......... H04N 5/23212; H04N 5/23245; H04N 5/2356
See application file for complete search history.

(56) References Cited

U.S. PATENT DOCUMENTS

| | | | |
|---|---|---|---|
| 4,845,521 A | 7/1989 | Akashi | |
| 6,549,729 B1* | 4/2003 | Robins et al. | 396/103 |
| 2003/0020825 A1* | 1/2003 | Higuma et al. | 348/354 |
| 2005/0041136 A1* | 2/2005 | Miyata et al. | 348/345 |
| 2005/0168611 A1* | 8/2005 | Yamaya | 348/333.01 |
| 2005/0275742 A1* | 12/2005 | Baron | 348/345 |
| 2006/0171697 A1 | 8/2006 | Nojima | |
| 2008/0013941 A1* | 1/2008 | Daley | 396/121 |
| 2009/0015703 A1* | 1/2009 | Kim et al. | 348/333.12 |
| 2009/0161006 A1* | 6/2009 | Lee | 348/374 |
| 2009/0295931 A1* | 12/2009 | Cho | 348/220.1 |
| 2010/0149370 A1* | 6/2010 | Kim | 348/222.1 |
| 2010/0271536 A1* | 10/2010 | Campbell | 348/345 |
| 2011/0261252 A1* | 10/2011 | Chen | 348/349 |

FOREIGN PATENT DOCUMENTS

EP    0596327 A1    5/1994

OTHER PUBLICATIONS

EPO, Summons to attend oral proceedings pursuant to Rule 115(1) EPC, Sep. 8, 2014, 7 pgs.
Office Action issued in Canadian Application No. 2,775,421 on Nov. 8, 2013, 3 pages.
EPO, Extended European Search Report issued in European Application No. 11171736.9 on Nov. 19, 2012, 12 pages.
EPO, Communication pursuant to Article 94(3) EPC issued in European Application No. 11171736.9 on Aug. 7, 2013, 7 pages.
Office Action issued in Canadian Application No. 2,775,421 on Feb. 4, 2015, 3 pages.

* cited by examiner

*Primary Examiner* — Jason Flohre

(74) *Attorney, Agent, or Firm* — Fish & Richardson P.C.

(57) ABSTRACT

An apparatus and a method in an electronic device provide for controlling a camera, wherein the camera can selectively operate in a first focus mode and in a second focus mode. The first focus mode is initially selected. In response to detecting a state of the electronic device, the second focus mode is selected. The first focus mode can be an autofocus mode. The second focus mode can be an extended depth of field mode, wherein software processing is used to extend the focus range of the camera. The detected state of the electronic device can be a previous user selection, a low power mode, or a continued request for taking photographs following taking a photograph in the autofocus mode.

14 Claims, 3 Drawing Sheets

APPARATUS AND METHOD FOR CONTROLLING A CAMERA IN AN ELECTRONIC DEVICE

The present disclosure relates generally to an electronic device, such as a digital camera, a cellular phone, a tablet computer, or other electronic device that includes a digital camera. More particularly, the present disclosure relates to an apparatus and a method for controlling a camera in an electronic device wherein the camera can be operated in a plurality of focusing modes.

BACKGROUND

Digital cameras have become small and inexpensive, and as a result, many electronic devices can include a digital camera. Examples of such electronic devices include many portable wireless electronic devices, such as cellular telephones, smart phones, tablet computers, laptop computers, and the like. These cameras can be convenient additions to electronic devices because the cameras are often portable enough to be carried with the user at most times. The camera in a portable device can be used for taking pictures and videos to document events and communicate with others. The camera can also be used as a data entry or data capture device, where the camera can be configured to scan documents and various types of bar codes. As computer processing power and storage capacity in portable electronic devices increases with improved technology, cameras can be used to capture vast amounts of image data (e.g., still photos and moving video images) and process, store, and communicate such data for many useful purposes.

A digital camera includes a lens that focuses light from objects in a scene on a light sensor or image sensor. The sensor can convert the light, at each pixel location on the sensor, into digital data. Although light beams or rays from all the objects in a scene can reach the image sensor, all light rays may not be in sharp focus on the sensor. In optics, depth of field (DoF) is the distance between the nearest and farthest objects in a scene that appear acceptably sharp in a captured image. The DoF is determined by the camera-to-subject distance, the lens focal length, the lens f-number (i.e., the lens opening), and the format size or circle of confusion criterion. The f-number is the focal length divided by the "effective" aperture diameter. Thus, the size of the opening in the aperture of the camera can be a compromise between allowing more light onto the sensor and sharply focusing the light from a wide range of distances between the camera lens and the objects being photographed.

Some cameras used in electronic devices use a focusing system referred to as an autofocus system. An autofocus system uses a motor to position the lens so that rays incident on a portion of the sensor can be brought into focus. Rays from other objects in the scene may or may not be suitably focused, depending upon the depth of field of the camera settings and the distances of the objects to the lens.

Another type of camera used in electronic devices uses a fixed focus system. The fixed focus system does not move the lens to focus the image on the sensor. Instead, an image is focused on the sensor by designing a lens configuration that attempts to bring many of the objects in the scene into focus (i.e., a configuration with a large DoF) without making the lens aperture too small, and thus making the camera too slow to capture an image. In other words, the fixed focus camera relies on sufficient depth of field to produce acceptably sharp images. The advantage of the fixed focus design is that it can be produced very inexpensively, more so than autofocus or manual focus systems. It is also reliable because it lacks moving parts. It can also be faster and easier to use. The system is effectively automatic; the photographer need not worry about focusing. It can also be more predictable than autofocus systems.

There are now various software algorithms and techniques that can be used to extend the DoF of a fixed focus camera and make it possible to increase or extend the depth of field by analyzing and processing the data captured in a digital image. By properly profiling the lens and image sensor configuration, software algorithms can be used to restore focus to blurred images by reconstructing light rays corresponding to blurred portions of a captured image.

It is in view of this background information related to the design and use of a camera in an electronic device that the significant improvements of the present disclosure have evolved.

DETAILED DESCRIPTION

Figure 1:
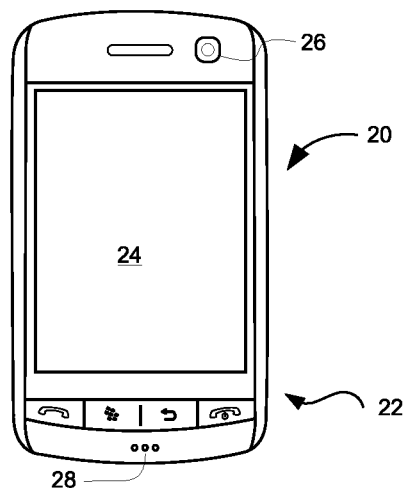
FIG. 1 illustrates an electronic device, such as a smart phone, having a camera.

An embodiment of the present disclosure advantageously provides an apparatus and a method for controlling a camera in an electronic device. The disclosure generally relates to an electronic device, which can be a portable electronic device, or a wireless electronic device, in the embodiments described herein. Examples of an electronic device include a digital camera, a digital music player, or a digital scanner. Examples of a wireless device include mobile, or handheld, wireless communication devices, such as pagers, cellular phones, smart phones, wireless organizers, personal digital assistants, wirelessly enabled notebook computers, tablet computers, handheld computers, and the like.

For simplicity and clarity of illustration, reference numerals may be repeated among the figures to indicate corresponding or analogous elements. Numerous details are set forth to provide an understanding of the embodiments described herein. Some embodiments may be practiced without these details. In other instances, well-known methods, procedures, and components have not been described in detail to avoid obscuring the embodiments described. The description should not be considered as limited to the scope of the embodiments described herein.

Referring first to FIG. 1, a representative electronic device 20 is depicted. While in the example of FIG. 1, electronic device 20 is a smart phone, other examples of electronic devices 20 can include a digital camera, a bar code scanner, a cellular telephone, a tablet computer, a laptop computer, and other similar data processing devices. Some of these exemplary electronic devices 20 can communicate wirelessly with a network, such as a cellular phone network, data network, or wireless local area network. Electronic device 20 may also be able to communicate data representing text, images, video, data files, command and control information, programs, and the like. Microphone 28 can be used to record audio information, or provide other sound input to electronic device 20.

User operation of electronic device 20 can be implemented with buttons or keypad 22, which can be used to select various menus and functions. In other embodiments, data, menus, and functions of electronic device 20 can be displayed and selected (or otherwise manipulated) using display 24. In some embodiments, display 24 can be a touchscreen, which is sensitive to human touch or input with a stylus. Using a touchscreen, a keypad 22 can be implemented as a display of keys or buttons arranged on display 24. Keypad 22 and display 24 can be used together to enter text data into electronic device 20. Such data can be used to control, set parameters, or select operating modes for operating a camera, such as camera 26. Display 24 can be used to frame photographs or video, display photographs or video from memory, and to display menus or operating modes of camera 26.

Electronic device 20 can include more than one camera 26, wherein such cameras can be arranged on the front and back of electronic device 20. In some embodiments, a camera on the back of electronic device 20 can be a higher quality camera for taking better photographs and video, while a camera on the front of electronic device 20 (which is shown in FIG. 1) can be a lower quality camera for operating in a video chat or video call mode.

Figure 2:
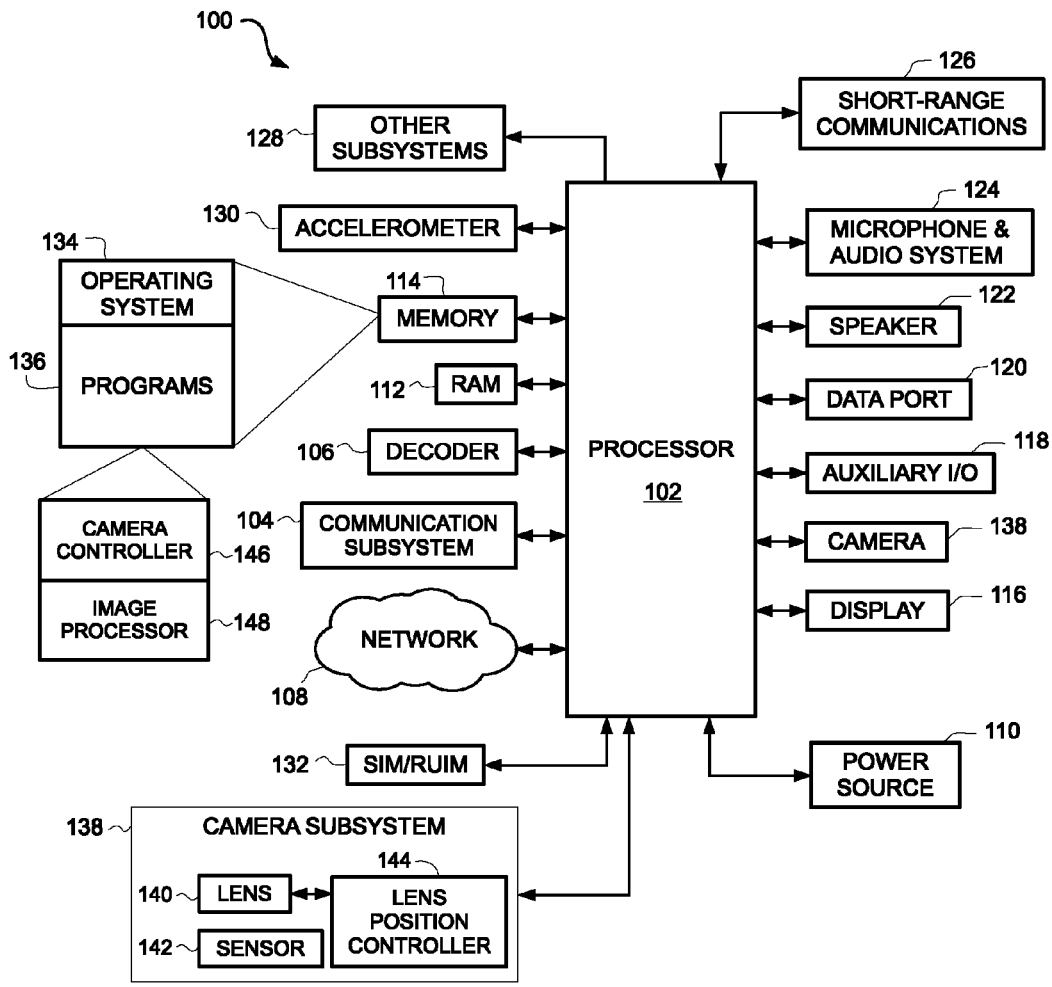
FIG. 2 depicts a high-level functional block diagram of an electronic assembly for operation of the electronic device shown in FIG. 1.

FIG. 2 depicts a high-level functional block diagram of an electronic assembly 100 for operating electronic device 20 shown in FIG. 1. Electronic assembly 100 can include multiple components, such as processor 102, which can control the overall operation of electronic device 20. In some embodiments, communication functions provided by electronic device 20 can include voice, data, and command communications, which may be implemented by communication subsystem 104. Communication subsystem 104 can be used to initiate and support an active voice call or data communication session. Communication subsystem 104 can include various combinations of hardware, software, and firmware to perform various designed functions. The software can be functionally or conceptually divided into software modules. Software in one module may share or call upon functions in other modules.

Data received by electronic device 20 can be processed, including decompressed and decrypted, by decoder 106. Communication subsystem 104 can receive messages from, and send messages to, wireless network 108. Communication subsystem 104 can help initiate and operate an active call, wherein electronic device 20 is in a real-time voice communication session. Wireless network 108 may be any type of wireless network, including, but not limited to, a cellular network, a wireless data network, a wireless voice network, and a network that supports both voice and data communications. Wireless network 108 can use a variety of formats or protocols, such as formats or protocols specified by standards including Global System for Mobile Communications (GSM), Code division multiples access (CDMA), wireless Ethernet (Institute of Electrical and Electronics Engineers standard 802.11), Wi-Fi, and other similar standards and wireless networking protocols.

Power source 110 can provide power to operate or charge electronic device 20, and can be implemented with one or more rechargeable batteries, or a port to an external power supply, wherein such power supply provides the appropriate power to all components of electronic assembly 100.

Processor 102 can interact with other components, such as random access memory (RAM) 112, memory 114, display 116 (illustrated in FIG. 1 as display 24), auxiliary input/output (I/O) subsystem 118, data port 120, speaker 122, microphone and audio system 124, short-range communications subsystem 126, and other subsystems 128. A user can enter data and operate functions of electronic device 20 with a data input device coupled to processor 102. Data input devices can include buttons or keypad 22 (see FIG. 1), or, in some embodiments, a graphical user interface produced on display 116, which can use touches and gestures detected by a touch-sensitive overlay on display 116. Processor 102 can interact with keypad 22 and/or the touch-sensitive overlay via an electronic controller (which can be represented by other subsystems 128). As part of the user interface, information, such as text, characters, symbols, images, icons, and other items that may be displayed or rendered on electronic device 20, can be displayed on display 116. Processor 102 can interact with accelerometer 130, which may be used to detect a direction of gravitational forces, or user-input acceleration forces. When using camera 26, accelerometer 130 can be used to record an orientation of a photograph. In other embodiments, buttons, such as buttons and keypad 22 in FIG. 1, can be used to operate select functions of electronic device 20.

To identify and authenticate a subscriber for obtaining access to wireless network 108, electronic device 20 can use a subscriber identity module or a removable user identity module (SIM/RUIM) card 132. Alternatively, user identification information can be programmed into memory 114.

Electronic device 20 can include operating system 134 and software programs 136, which can both be executed by processor 102. Operating system 134 and software programs 136 can be stored in a persistent, updatable store, such as memory 114. Additional applications or programs can be loaded onto electronic device 20 through wireless network 108, auxiliary I/O subsystem 118, data port 120, short-range communications subsystem 126, or any other subsystem 128 suitable for transferring program files. Software programs 136 can include software modules, such as camera controller module 146 and image processor module 148, which are responsible for controlling the operation of camera subsystem 138 and processing or refining image data captured by camera system subsystem 138. Such software modules can call upon various hardware and software resources within electronic device 20 to execute the function of such software modules.

A received signal, such as a text message, an e-mail message, or web page download can be processed by communication subsystem 104 and input to processor 102. Processor 102 can processes the received signal for output to the display 116 and/or to the auxiliary I/O subsystem 118. A wireless device user may generate data items, for example e-mail messages containing a photograph, which may be transmitted over wireless network 108 through communication subsystem 104. For voice communications, the overall operation of electronic device 20 can be similar. Speaker 122 can be used to output audible information converted from electrical signals, and microphone and audio system 124 can be used to convert audible information into electrical signals for processing.

Camera subsystem 138 can include lens 140, image sensor 142, and lens position controller 144. Lens 140 can be used to focus rays of light from a scene onto the surface of the image sensor 142. Image sensor 142 converts incident light into pixel data representing a photograph, which can be stored in RAM 112 or memory 114 by processor 102. Lens position controller 144 can include a motor or other suitable device to correctly position lens 140 so that the subject of the photograph is properly focused.

Camera controller module 146 can include software, firmware, or other hardware needed to control the operation or configuration of camera subsystem 138. For example, camera controller module 146 can include software for controlling a focusing mode of camera subsystem 138. Additionally, selection of a focusing mode of camera subsystem 138 can be in response to various conditions, configurations, or status within electronic device 20.

Figure 3:
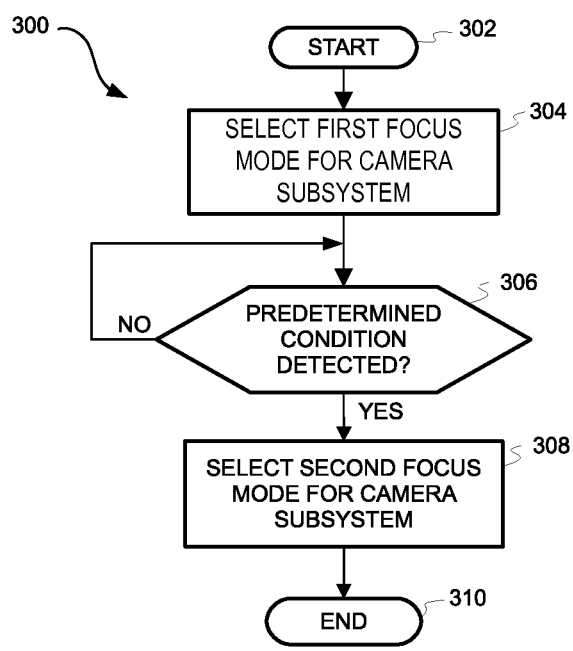
FIG. 3 is a high-level flowchart illustrating a method of controlling a camera, in accordance with an example embodiment of the present disclosure.

Referring now to FIG. 3, there is depicted a high-level flowchart illustrating an exemplary method of controlling a camera in an electronic device, in accordance with one or more exemplary embodiments of the present disclosure. Such exemplary methods can be controlled by software that can be executed on hardware shown in FIG. 2. For example, the method may be controlled by camera controller module 146 and executed on processor 102 within electronic assembly 100. Other embodiments can use various combinations of hardware, firmware, or software to perform similar methods and processes.

As illustrated, method 300 begins at block 302, and continues at block 304, wherein the method selects a first focus mode for the camera subsystem, wherein the camera subsystem can operate in more than one focusing mode. In one embodiment, the first focus mode can be an autofocus mode, wherein the camera is focused by moving a camera lens (e.g., lens 140 in camera subsystem 138 shown in FIG. 2 can be moved by lens position controller 144) to produce a sharp image of the subject on the image sensor (e.g., image sensor 142).

After selecting the first focus mode, the process determines whether a predetermined condition has been detected in the electronic device, as depicted at decision block 306. If the predetermined condition has not been detected, the process periodically checks again for the predetermined condition, as illustrated by the "no" branch from block 306. If the predetermined condition has been detected, the process passes to block 308 wherein a second focus mode is selected for the camera subsystem.

In one embodiment of the disclosure, the first focus mode can be an autofocus mode, and the second focus mode can be an extended depth of field mode. Conversely, the first focus mode may be an extended depth of field mode, and the second focus mode may be an autofocus mode.

One predetermined condition that can be detected is when the camera is not currently set in the focus mode that was last selected by the user. For example, at power on (i.e., block 302) the camera may be initialized to the EDoF mode. At block 306, the process may determine that the user last selected the autofocus mode and that the camera is not currently in the last selected mode. Then, proceeding along the "yes" branch of block 306, the process can select the autofocus mode for the camera, as depicted at block 308. In this manner, electronic device 20 can remain in the focus mode last set by the user, which can alleviate the user from configuring the mode of camera operation each time the camera is turned on or selected to take a photograph.

Another predetermined condition that can be detected at block 306 can be a low-power mode in electronic device 20. Yet another condition that can be detected can be a rapid shooting mode selected following a photograph taken in an autofocus mode. In response to these and other predetermined conditions or status of various aspects of electronic device 20, process 300 can change the focus mode of camera subsystem 138.

Figure 4:
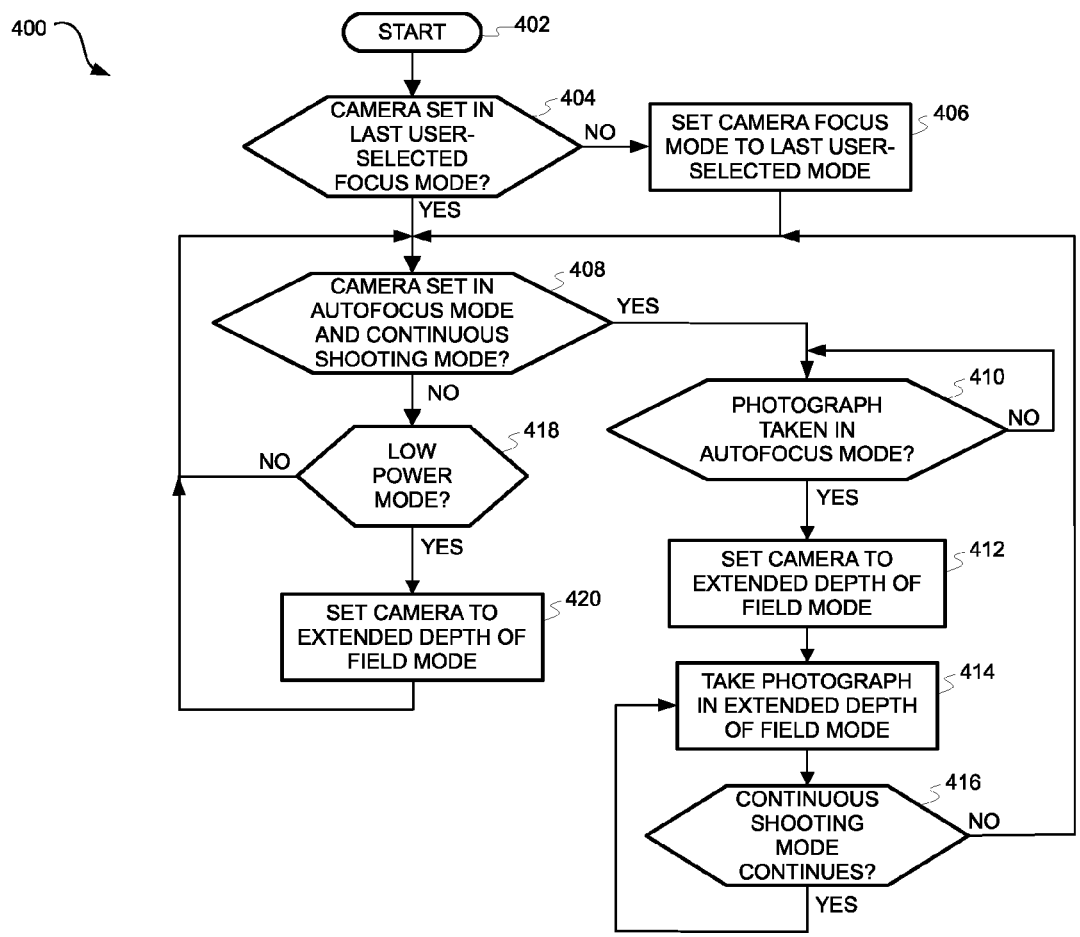
FIG. 4 is another high-level flowchart illustrating a method of controlling a camera in an electronic device in accordance with an example embodiment of the present disclosure.

Referring now to FIG. 4, there is depicted a high-level flowchart illustrating an exemplary method of controlling a camera in an electronic device, in accordance with another embodiment of the present disclosure. As illustrated, process 400 begins at block 402, and thereafter passes to block 404, wherein the process determines whether electronic device 20 is set in the last user-selected focus mode for the camera subsystem. In one example, if the user has set the camera to operate in an autofocus mode whenever electronic device is turned on, or whenever a picture taking function is selected, the process can determine whether the camera focusing mode remains set to the autofocusing mode as previously selected by the user, despite the fact that the camera may initialize in another focusing mode. In one embodiment, the fact that the current focusing mode of the camera is not the user's last-selected focusing mode can be considered a predetermined condition or state of the electronic device that can be used to initiate a change of the focusing mode of the camera.

If the camera focus mode is not set to the last user-selected focus mode, the process sets the camera in the last user-selected camera focus mode, as depicted at block 406. Setting the camera to the last selected mode can keep the user from being inconvenienced each time the camera photo taking application is selected. In one embodiment, camera controller module 146 can be used to sense the current camera focusing mode and compare it to the focusing mode previously selected by the user. If necessary, camera controller module 146 can reset the camera focusing mode to the previously selected mode.

After setting the camera focus mode to the last user-selected mode, the process determines whether the camera is set in the autofocus mode and in the continuous shooting mode, as depicted at decision block 408. The continuous shooting mode can also be referred to as a "rapid shooting" mode, wherein the camera is set to take a series of photographs, one after another, in rapid succession. This mode is typically used to capture an action of the subject, such as the subject running to catch a ball.

If the autofocus mode and the continuous shooting mode have been selected, the process determines whether a first photograph as been taken using the autofocus mode, as illustrated at block 410. If not, the process waits for the first picture to be taken in the autofocus mode as shown by the iteration from the "no" branch from block 410.

If a first photograph has been taken at block 410, the process sets the camera focus mode to an extended depth of field focusing mode, as depicted at block 412. In this example, process 400 has detected a status of the electronic device that indicates that the autofocus mode is selected, a continuous shooting mode is selected, and the first photograph has been taken in the autofocus mode. In response to this status, the process changes the focus mode from the autofocus mode to the EDoF mode.

Next, the process takes additional photos in the extended depth of field focusing mode, as illustrated at block 414 and the loop including decision block 416. Thus, if the camera is set to the "rapid shooting" mode, the camera can take one photograph after another as fast as the digital image can be captured and stored for as long as the rapid shooting mode continues at block 416. One way the user can place the camera in the rapid shooting mode is by continuing to hold the shutter or shooting button down (e.g., hold the shutter button in the active position). Releasing the shutter button can discontinue the rapid shooting mode at block 416. Another way to request rapid shooting mode is to enter a number of photographs to take once the shutter button is depressed or activated. In this situation, block 416 can count the number of pictures taken until it matches the number pictures requested.

In the extended depth of field focusing mode, the camera captures a digital image and then subsequently processes the digital data of the image to improve the image by extending the focus range or depth of field of the image. Using EDoF software in the image processor module 148, areas of the photograph that were not initially in focus on the image sensor can be manipulated to improve the focus of the image. During this process, pixels in areas of the photograph are analyzed, and values of the pixels are recalculated to produce a new digital image file having a greater depth of field, wherein areas of the image that were not in focus when the data was captured can be brought into focus by digital post processing techniques.

In order to correctly implement the extended depth of field image processing, the extended depth of field algorithm may need to use various measurements and settings in camera subsystem 138 as input for the calculations involved in extending the depth of field. For example, the precise position of lens 140 may be needed in the EDoF calculations. In some instances, the effective aperture of camera subsystem 138 may be needed for the calculations. In order to facilitate these calculations, image processor module 148 can be coupled to camera subsystem 138 via processor 102 to provide all the necessary data and measurements needed for the EDoF calculations.

Note that process 400 changed the image focus mode of the camera from the autofocus mode to the EDoF mode in response to the condition, or the state, of the electronic device, wherein, in this example, the state included the autofocus mode selected together with a rapid shooting mode following the first autofocus picture. By changing the focusing mode of camera from autofocus to EDoF, the speed of the rapid shooting mode can be increased and more photographs can be captured, which can improve the chances of capturing a valuable photograph in a rapid sequence of events. This is because the EDoF mode can effectively reduce the time to focus between photographs. Additionally, the EDoF mode can save battery power, and may provide more reliable focusing results by reducing the chance that the autofocus will misfocus (i.e., focus on the wrong subject).

The rapid shooting mode can be similar to recording a video. Thus, in another embodiment, electronic device 20 can begin capturing video data in an autofocus mode, and then change to an EDoF mode to maintain focus of the video image. Depending upon the processing capacity and speed of electronic device 20, the EDoF calculations may be performed frame-by-frame as the video information is stored, or in a post processing mode after a raw video file is stored in memory.

After enough photographs have been taken in the rapid shooting mode, the process passes from block 416 to block 408, wherein the process continues to detect predetermined conditions. If, at block 408, the camera is not set in the autofocus mode and in the continuous shooting mode, the process passes from block 408 to block 418, wherein the process determines whether the electronic device is in a low-power mode. Electronic device 20 can be in a low-power mode if power source 110 is nearing complete discharge, such as when a battery is discharged, and only a predetermined percentage of charge remains in the battery.

If the electronic device is not in a low-power mode, the process can iteratively pass from block 418 to block 408 to continue to check for states of the electronic device that invoke a change of the focus mode of the camera. If, at block 418, electronic device 20 is in a low-power mode, the process sets the camera focus mode to extended depth of field mode, as illustrated at block 420. Changing the focus mode to extended depth of field mode can help extend the useful time of charge remaining in a battery in power source 110. The extended depth of field focus mode can be more power efficient than autofocus mode, which can use a motor in lens position controller 144 to position lens 140, or otherwise change the shape of lens 140. Additionally, in some embodiments, the post processing required to sharpen the focus of a raw image can be postponed until the batteries of power source 110 have been recharged. In this manner, energy required to perform the EDoF calculations can be saved until the batteries have been recharged. Following block 420, process 400 can iteratively return to block 408.

In some embodiments of the disclosure, the camera focusing mode can be changed to conserve power, while in other embodiments, the camera focusing mode can be changed to increase the speed of taking photographs, or increase the reliability or predictability of taking photographs. Other embodiments of the disclosure can include taking the same photograph more than once using more than one focusing mode so that the user can select the best resulting photograph. In each of these embodiments, a camera controller module is used to select a focusing mode of a camera in response to a state of the electronic device.

In some embodiments of the present disclosure, camera lens 140 can be returned to a predetermined position before taking a photograph in the EDoF mode. The predetermined position can be optimally selected in a manner similar to the selection of a lens configuration for a fixed focus camera, wherein the compromise between depth of field and effective lens aperture has been considered. In other embodiments, any lens position or configuration can be used for taking photographs in the EDoF mode. In this case, data describing the position and configuration of lens 140 and other elements of camera subsystem 138 can be provided to image processor module 148 for use in the extended depth of field calculations.

Presently preferred embodiments of the disclosure, and many improvements and advantages thereof, have been described with particularity. The description includes preferred examples of implementing the disclosure, and these descriptions of preferred examples are not intended to limit the scope of the disclosure. The scope of the disclosure is defined by the following claims.

What is claimed is:

1. An electronic device comprising:
    a processor;
    a memory coupled to the processor;
    a camera subsystem coupled to the processor for capturing image data and storing the image data in the memory, wherein the camera subsystem can selectively operate in a plurality of focus modes, the plurality of focus modes comprising an autofocus mode and an extended depth of field (EDoF) mode, the camera subsystem being placed in an initial focus mode at and in response to each camera initialization; and
    a camera controller module coupled to the processor for selecting a focus mode of the camera subsystem, the camera controller module configured to:
        in response to a particular camera initialization:
            sense the initial focus mode of the camera subsystem;
            compare the initial focus mode to a last-user-selected mode selected prior to the particular camera initialization; and
            detect that the initial focus mode is different than the last-user-selected mode selected prior to the particular camera initialization; and
        in response to detecting that the initial focus mode is different than the last-user-selected mode selected prior to the particular camera initialization and prior to an image being taken, set the camera subsystem to operate in the last-user-selected mode.

2. The electronic device of claim 1 wherein the electronic device further comprises an image processor coupled to the camera subsystem for extending the depth of focus of the image data using a computational algorithm.

3. The electronic device of claim 1 wherein the camera controller module is configured to select the EDoF mode in response to a state of the electronic device indicating that a picture has been taken in the autofocus mode and that a continuous shooting mode has been selected for consecutively capturing additional image data.

4. The electronic device of claim 1 wherein the camera controller module is configured to select the EDoF mode in the camera subsystem in response to a state of the electronic device indicating that the electronic device is in a low power mode.

5. The electronic device of claim 1 wherein the electronic device further comprises a smart phone.

6. The electronic device of claim 1 wherein the camera subsystem further comprises:
   a lens;
   an image sensor positioned to receive light passing through the lens; and
   a lens position controller coupled to the lens for moving the lens relative to the image sensor.

7. The electronic device of claim 1 wherein setting the camera subsystem to operate in the last-user-selected mode selected prior to the particular camera initialization is performed immediately after detecting that the initial focus mode is different than the last-user-selected mode.

8. The electronic device of claim 1 wherein setting the camera subsystem to operate in the last-user-selected mode selected prior to the particular camera initialization is performed without delaying to wait for receipt of user input associated with focus mode selection.

9. A method for controlling a camera in an electronic device, wherein the camera can focus using a plurality of focusing modes for focusing light on an image sensor, the method comprising:
   initializing the camera to an initial focusing mode at and in response to each camera initialization;
   in response to a particular camera initialization:
      sensing the initial focusing mode of the camera;
      comparing the initial focusing mode to a last-user-selected mode selected prior to the particular camera initialization; and
      detecting that the initial focusing mode is different than the last user-selected focusing mode selected prior to the particular camera initialization; and
   in response to detecting that the initial focusing mode is different than the last user-selected focusing mode selected prior to the particular camera initialization and prior to an image being taken, setting the camera to operate in the last user-selected focusing mode.

10. The method of claim 9 wherein the initial focusing mode comprises an autofocusing mode that uses a motor to move a lens to focus light on the image sensor.

11. The method of claim 9 wherein the last user-selected focusing mode comprises an extended depth of field (EDoF) focusing mode that uses software image processing to increase a depth of focus of the image.

12. The method of claim 9 further comprising changing the focusing mode of the camera from an autofocus mode to an EDoF mode after taking a photograph in the autofocus mode, wherein the changing the focusing mode is in response to the camera being set in the autofocus mode, and the camera being set to a rapid shooting mode, and a photograph taken in the autofocus mode.

13. The method of claim 9 further comprising changing the focusing mode of the camera from an autofocus mode to an EDoF mode in response to detecting a low power mode in the electronic device.

14. The method of claim 9 wherein the electronic device comprises a cellular telephone.

* * * * *